US012567601B2

(12) United States Patent
Ogata et al.

(10) Patent No.: US 12,567,601 B2
(45) Date of Patent: Mar. 3, 2026

(54) SYSTEMS AND METHODS FOR A BATTERY UTILIZING SEPARATE PRESSURE HOMOGENIZING MEDIUM LAYERS BETWEEN A BATTERY POUCH AND A PLANE JIG

(71) Applicant: TeraWatt Technology Inc., Santa Clara, CA (US)

(72) Inventors: Ken Ogata, Tokyo (JP); Yang Yang, Tokyo (JP); Hajime Hoshi, Tokyo (JP); Masatsugu Nakano, Tokyo (JP); Hiroshi Imoto, Tokyo (JP)

(73) Assignee: TeraWatt Technology Inc., Tokyo (JP)

( * ) Notice: Subject to any disclaimer, the term of this patent is extended or adjusted under 35 U.S.C. 154(b) by 597 days.

(21) Appl. No.: 18/072,961

(22) Filed: Dec. 1, 2022

(65) Prior Publication Data

US 2023/0335781 A1      Oct. 19, 2023

Related U.S. Application Data

(63) Continuation of application No. 16/578,343, filed on Sep. 22, 2019, now Pat. No. 11,522,212.

(51) Int. Cl.
H01M 10/04          (2006.01)
H01M 10/0525          (2010.01)
(Continued)

(52) U.S. Cl.
CPC ... H01M 10/0481 (2013.01); H01M 10/0525 (2013.01); H01M 10/058 (2013.01); H01M 10/48 (2013.01); *H01M 50/20* (2021.01)

(58) Field of Classification Search
CPC ......... H01M 10/0481; H01M 10/0525; H01M 10/058; H01M 10/48
(Continued)

(56) References Cited

U.S. PATENT DOCUMENTS 10,355,319 B1      7/2019  Lim et al.
2012/0105068 A1      5/2012  Wang et al.
(Continued)

FOREIGN PATENT DOCUMENTS

EP          3886202 A1      9/2021
WO      2019017994 A1      1/2019

OTHER PUBLICATIONS

"displace." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1240929. (Year: 2010).*
(Continued)

*Primary Examiner* — Sean P Cullen
(74) *Attorney, Agent, or Firm* — Kilpatrick Townsend & Stockton LLP

(57)          ABSTRACT

A battery cell having a layered pressure homogenizing soft medium for liquid/solid state Li-ion rechargeable batteries. The battery cell of the present technology includes one or more battery pouches, a pressure mechanism external to the battery pouches that applies a pressure to the battery pouches, and a layered pressure homogenizing soft medium that is displaced between the battery pouches and the pressure mechanism. By using a number of pressure homogenizing medium layers, each with a specific range of thickness and within a range of physical properties, the battery pouches displaced between the pressure homogenizing medium layers are evenly pressurized by the mediums due to pressure applied by the pressure mechanism to within a desired range of pressure. The pressure applied to the battery pouches by the pressure homogenizing medium is monitored by a pressure sensor, such as a two-dimensional pressure sensor. If the pressure to the battery pouches is not within a desired pressure range, a controller can control the pressure
(Continued)

mechanism to adjust the pressure to the mediums and battery pouches to bring the pressure within the desired range.

18 Claims, 10 Drawing Sheets

(51) Int. Cl.
  *H01M 10/058* (2010.01)
  *H01M 10/48* (2006.01)
  *H01M 50/20* (2021.01)
(58) Field of Classification Search
  USPC ........................... 429/61, 156, 158, 159, 162
  See application file for complete search history.

(56) References Cited

U.S. PATENT DOCUMENTS

| | | | |
|---|---|---|---|
| 2012/0105069 A1 | 5/2012 | Wang et al. | |
| 2013/0317771 A1 | 11/2013 | Laskowsky et al. | |
| 2017/0033572 A1 | 2/2017 | Becker et al. | |
| 2017/0052228 A1 | 2/2017 | Hariharan et al. | |
| 2017/0146608 A1 | 5/2017 | Lee et al. | |
| 2018/0048036 A1* | 2/2018 | Melack | H01M 10/6554 |
| 2019/0123317 A1* | 4/2019 | Wiles | H01M 10/0525 |
| 2020/0194753 A1* | 6/2020 | Fujiwara | H01M 10/48 |

OTHER PUBLICATIONS

Dubarry et al., "Identify capacity fading mechanism in a commercial LiFePO4 cell", Journal of Power Sources 194 (2009); 541-549.

He et al., "Online model-based estimation of state-of-charge and open-circuit voltage of lithium-ion batteries in electric vehicles", J. Energy 39 (2012); 310-318.

Levenberg, K., "A Method For The Solution of Certain Non-Linear Problems in Least Squares", J. Quarterly Applied Mathematics 2 (1944); 164-168.

Marquardt, D., "An Algorithm for Least-Squares Estimation of Nonlinear Parameters", Journal of the Society for Industrial and Applied Mathematics, vol. 11 No. 2 (1963); 431-441.

Vetter et al., "Ageing mechanisms in lithium-ion batteries", Journal of Power Sources, 147 (2005); 269-281.

International Search Report and Written Opinion for PCT/US2020/051527 mailed Dec. 18, 2020, all pages.

\* cited by examiner

300

500

600

620
622
624
610
610
626
627
610
628

630
640

700

| Initiate battery |
|---|

710

| Apply initial pressure to battery pouches of battery cell |
|---|

720

| Detect pressure of battery pouches within battery cell |
|---|

730

| Automatically adjusting pressure applied to battery pouches based on detected pressure |
|---|

740

800

| Control Parameter | Value Range |
|---|---|
| Number of layers | 1-30 |
| Thickness of layer | 0.01-10 (nm) |
| Young's Module | 0.01-3.0 (GPa) |
| Density of medium | 0.1-2.0 (g/cc) |
| Applied Pressure | 0.01-15 (MPa) |

SYSTEMS AND METHODS FOR A BATTERY UTILIZING SEPARATE PRESSURE HOMOGENIZING MEDIUM LAYERS BETWEEN A BATTERY POUCH AND A PLANE JIG

CROSS-REFERENCE TO RELATED APPLICATIONS

This application is a continuation of U.S. application Ser. No. 16/578,343, filed Sep. 22, 2019, which is hereby incorporated by reference in its entirety for all purposes.

SUMMARY

The present technology, roughly described, includes a battery cell having a layered pressure homogenizing soft medium for liquid/solid state Li-ion rechargeable batteries. The battery cell of the present technology includes one or more battery pouches, a pressure mechanism external to the battery pouches that applies a pressure to the battery pouches, and a layered pressure homogenizing soft medium that is displaced between the battery pouches and the pressure mechanism. By using a number of pressure homogenizing medium layers, each with a specific range of thickness and within a range of physical properties, the battery pouches displaced between the pressure homogenizing medium layers are evenly pressurized by the mediums due to pressure applied by the pressure mechanism to within a desired range of pressure. The pressure applied to the battery pouches by the pressure homogenizing medium is monitored by a pressure sensor, such as a two-dimensional pressure sensor. If the pressure to the battery pouches is not within a desired pressure range, a controller can control the pressure mechanism to adjust the pressure to the mediums and battery pouches to bring the pressure within the desired range.

In embodiments, a lithium-ion battery cell can include one or more pressure homogenizing medium layers. The lithium-ion battery cell can include a battery casing, one or more lithium ion pouches, a first plane jig and a second plane jig, a pressure sensor, and one or more pressure homogenizing medium layers. The one or more lithium ion pouches can be displaced adjacent to each other within the battery casing. The first plane jig can be displaced at a first end of the one or more lithium ion pouches and the second plane jig can be displaced at a second end of the one or more lithium ion pouches. The pressure sensor can be displaced between the first plane jig and the second plane jig, and can detect a pressure applied to the one or more lithium ion pouches. The pressure applied to the one or more lithium ion pouches can be adjusted based on the detected pressure. The one or more pressure homogenizing medium layers can be displaced between first plane jig and the second plane jig.

In embodiments, a method for maintaining a homogenous pressure on battery pouches of a lithium-ion battery cell includes applying an initial pressure to one or more lithium ion battery pouches contained within a battery cell. The battery cell can include a first plane jig and a second plane jig, a pressure sensor, and one or more pressure homogenizing medium layers. The first plane jig can be positioned near a first end of the one or more lithium ion pouches and the second plane jig can be positioned near a second end of the one or more lithium ion pouches. The pressure sensor can be displaced between the first plane jig and the second plane jig within the battery cell. The one or more pressure homogenizing medium layers can be displaced between first plane jig and the second plane jig. The method also includes detecting a pressure to the one or more lithium ion battery pouches by the pressure sensor, and automatically adjusting the pressure applied to the lithium ion battery pouches by a pressure mechanism based on the detected pressure.

DETAILED DESCRIPTION

The present technology includes a battery cell having a layered pressure homogenizing soft medium for liquid/solid state Li-ion rechargeable batteries. The battery cell of the present technology includes one or more battery pouches, a pressure mechanism external to the battery pouches that applies a pressure to the battery pouches, and a layered pressure homogenizing soft medium that is displaced between the battery pouches and the pressure mechanism. By using a number of pressure homogenizing medium layers, each with a specific range of thickness and within a range of physical properties, the battery pouches displaced between the pressure homogenizing medium layers are evenly pressurized by the mediums due to pressure applied by the pressure mechanism to within a desired range of pressure. The pressure applied to the battery pouches by the pressure homogenizing medium is monitored by a pressure sensor, such as a two-dimensional pressure sensor. If the pressure to the battery pouches is not within a desired pressure range, a controller can control the pressure mechanism to adjust the pressure to the mediums and battery pouches to bring the pressure within the desired range.

For both solid and liquid state secondary batteries (SSB), use of Li-metal is significantly attractive since it exhibits very high energy density. However, it typically shows very poor cyclability and safety resilience due to formation of dendrite. One of the primary causes of the dendrite formation is inhomogeneity of current density to the electrode. The present technology provides a solution toward the inhomogeneity by using an external pressure monitoring and homogenizing solution. In particular, external modules—external to the battery pouches themselves—of the present technology physically homogenize the internal pressure of the electrode and, consequently, provide for improved and more uniform electrode current density through the battery pouches of the battery cell.

Lithium battery cells that incorporate pouch cells receive force from the outside casing. Unlike prior battery cells that utilize cylindrical or winding cells, lithium pouch cells are liquid electrolyte cells. Rather, lithium ion pouch cells are steady state battery cells, and are characterized as having better chemistry and a different design that cylindrical or winding lithium ion battery cells that utilize liquid electrolyte. One aspect of lithium ion pouch cells is that they need a constant pressure in order to minimize dendrite and have uniform current density. Use of pressure homogenizing medium layers provide for a more even pressure distribution across the surface of pouch cells, thereby minimizing dendrite and providing a more uniform current density.

Figure 1A:
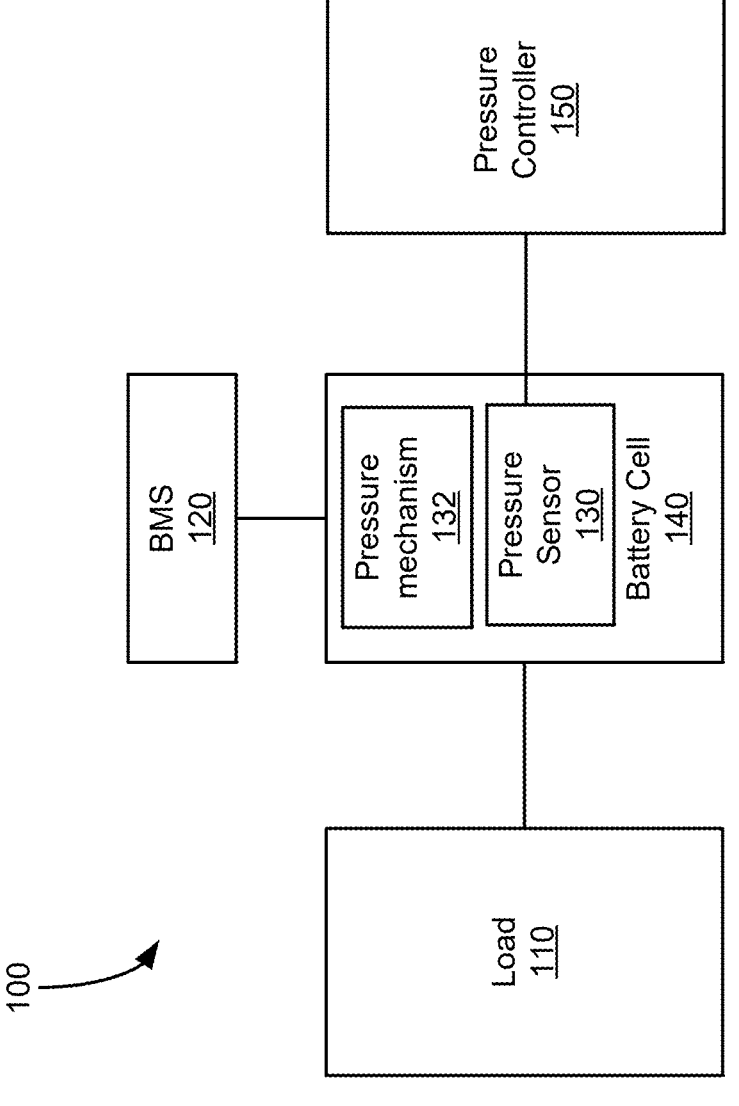
FIG. 1A is a block diagram of a battery system with a stand-alone controller.

FIG. 1 is a block diagram of a battery system with a stand-alone pressure controller. System 100 of FIG. 1 includes load 110, battery management system (BMS) 120, battery cell 140, and pressure controller 150. Battery cell 140 may provide a potential across load 110. Battery cell 140 may include one or more pouch cells, pressure homogenizing medium layers, a pressure mechanism 132, and pressure sensor 130. Pressure sensor 130 can detect the pressure applied by pressure mechanism, for example metal plates on opposing sides of the pouch cells and pressure homogenizing medium layers. BMS 120 may receive pressure readings from pressure sensor 130 and communicate with pressure controller 150 to apply pressure to the pouch cells from the metal plates.

Figure 1B:
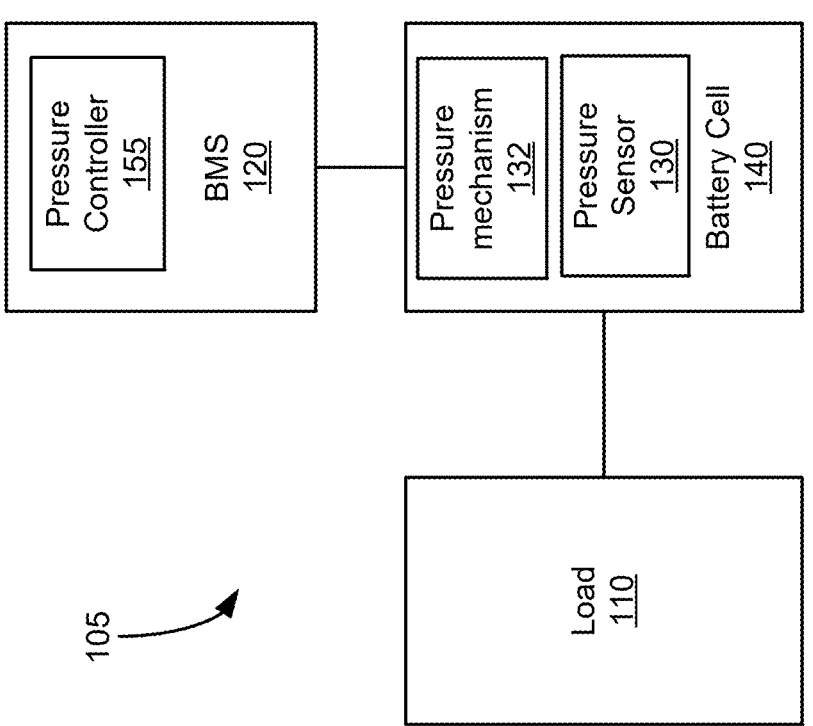
FIG. 1B is a block diagram of a battery system with a controller implemented within a battery management system.

FIG. 1B is a block diagram of a battery system with a controller implemented within system 105. The battery system of FIG. 1B has similar components to the system of FIG. 1A except that system 105 has a pressure controller 155 implemented within BMS 120. In the implementation of FIG. 1B, the BMS implemented controller may detect the pressure value from pressure sensor 130 and adjust the pressure applied to battery pouches and one or more pressure homogenizing medium layers of the battery cell 140. In this manner, BMS 120 may maintain a desired pressure between the pouch cells of battery cell 140 by controlling pressure controller 155 based on readings from pressure sensor 130.

Figure 2:
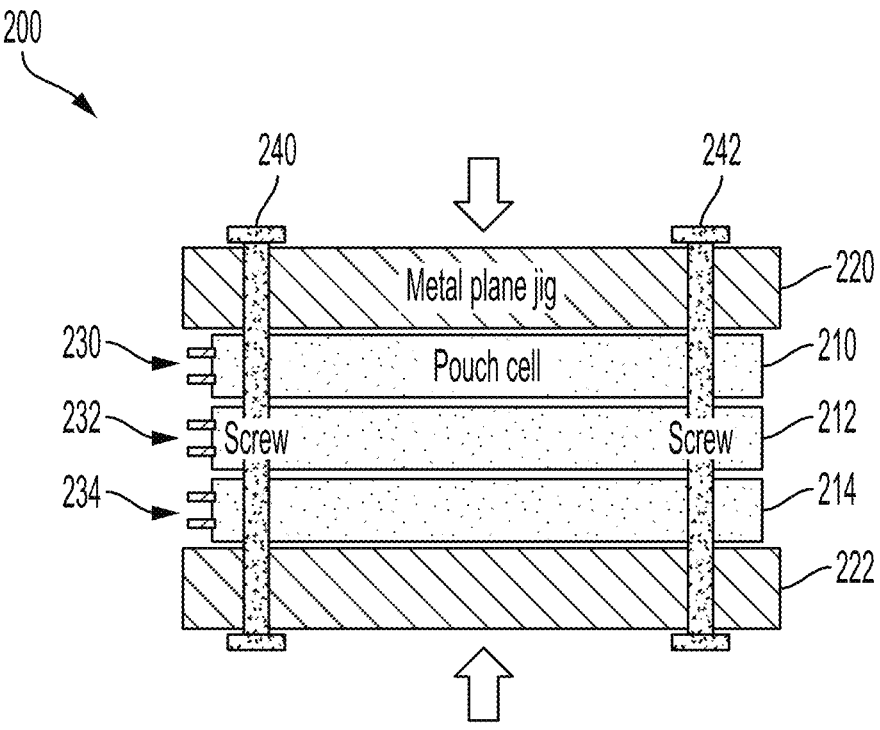
FIG. 2 is a block diagram of a pouch cell battery.

FIG. 2 is a block diagram of a pouch cell battery. Pouch cell battery 200 of FIG. 2 includes pressure mechanism components such as metal plane jigs 220 and 222 and pressure alignment screws 240 and 242. Pouch cell battery also includes pouch cells 210, 212, 214. The pouch cells may be positioned adjacent to each other, for example such that the flat surface of the pouch is facing a flat surface of an adjacent pouch, and may have terminals 230, 232, and 234, respectively, to provide charge from each pouch.

The pouch cells may operate in a more desirable manner when a certain pressure is applied to the pouch cells. As a result, the metal plane jigs 220 and 222 may be configured to apply a pressure to the pouch cells via pressure alignment screws 240 and 242. In some instances, a pressure mechanisms may include pressure alignment screws, motors to drive the metal plane jigs towards each other or away from each other along the screws, and other components typically used in an external pressure mechanism designed to apply a pressure to the pouch cells (and, as illustrated in FIG. 3, pressure homogenizing medium layers).

Figure 3:
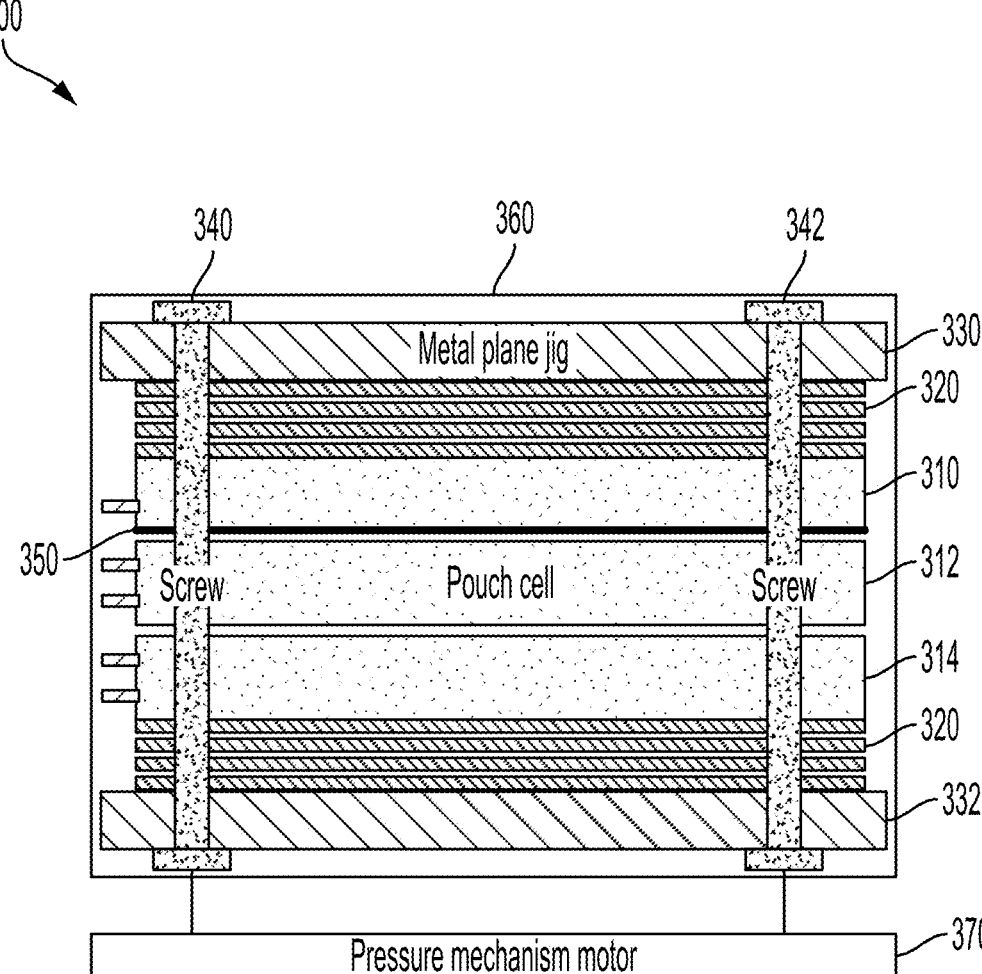
FIG. 3 is a block diagram of a pouch cell battery with a layered pressure homogenizer medium.

FIG. 3 is a block diagram of a pouch cell battery with pressure homogenizer medium layers. The pouch cell battery 300 of FIG. 3 includes pouch cells 310-314, a pressure mechanism, and one or more pressure homogenizer medium layers 320. The pressure mechanism includes components such as pressure alignment screws 343 42, metal plane jigs 330-332, and pressure mechanism motor 370. The pressure mechanism components are displaced is external to the pouch cells and contained within a battery cell casing 360. The pressure homogenizer medium layers 320 help ensure that a uniform pressure is applied to the pouch cells when the metal plane jigs are compressed together. A pressure sensor 350 can be positioned between the pouch cells or other positions within the pouch cell battery to detect a pressure being applied to the pouch cells. An external controller may receive pressure values and control the pressure mechanism by, for example, controlling a motor to move the metal plane jig plates toward each other or away from each other in order to achieve a desired pressure applied to the pouch cells as detected by pressure sensor 350.

The pressure mechanism components of FIG. 3 are just one example of several types of pressure systems that can apply pressure to the pouch cells externally from the pouch cells themselves. The pressure mechanism components discussed with respect to FIG. 3 are intended to be an example, and other implementations or variations of a pressure mechanism are considered within the scope of the present technology. Additionally, the pressure mechanism and the pressure sensor illustrated in FIG. 3 can be implemented in instances of the pouch cell battery illustrated and discussed with respect to FIGS. 4-6, but are not illustrated for purposes of simplicity and discussion.

The pressure homogenizer medium layers 320 may include one layer, two layers, three layers, or additional layers of pressure homogenizer mediums. In some instances, the pressure homogenizer medium layers 320 are placed between each metal plane jig and the pouch cells closest to the plane, such that the layers of pressure homogenizing medium are displaced between the pouch cells and the plan jig. In some instances, one or more mediums may also be placed between one or more pairs of pouch cells.

In some instances, a pressure pattern between pouch cells can vary based on the number of layered pressure homogenizer mediums used in a pouch cell battery. FIGS. 4A-6B illustrate different examples of pouch cell batteries with pressure homogenizer medium configurations and pressure patterns for each configuration.

Figure 4A:
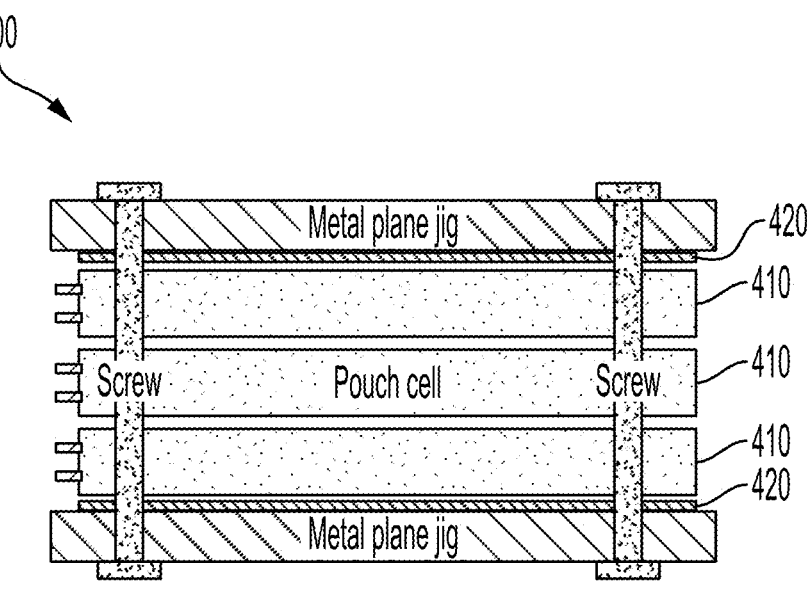
FIG. 4A is a block diagram of a pouch cell battery with a single layer pressure homogenizer medium.

FIG. 4A is a block diagram of a pouch cell battery with a single layer pressure homogenizer medium. As shown in FIG. 4A, pouch battery cell 400 includes a plurality of pouch cells 410 and one pressure homogenizer medium layer 420 positioned between each metal plane jig and the corresponding neighboring pouch cell. As such, there are two pressure homogenizer medium layers in FIG. 4A.

Figure 4B:
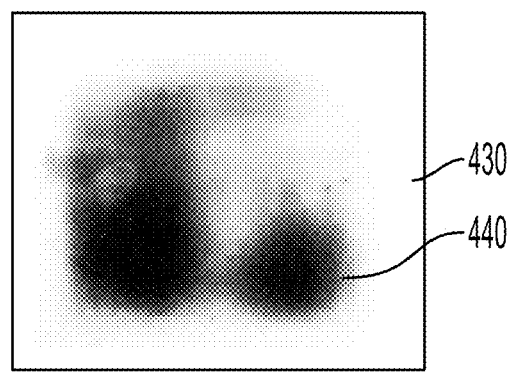
FIG. 4B is an illustration of a pouch cell pressure pattern for the single-layer pressure homogenizer medium.

FIG. 4B is an illustration of a pouch cell pressure pattern for the single-layer pressure homogenizer medium. The pouch cell pressure pattern 430 of FIG. 4B shows a fairly even distribution of pressure as shown by the discoloration 440 within the pouch cell area of pressure pattern 430.

Figure 5A:
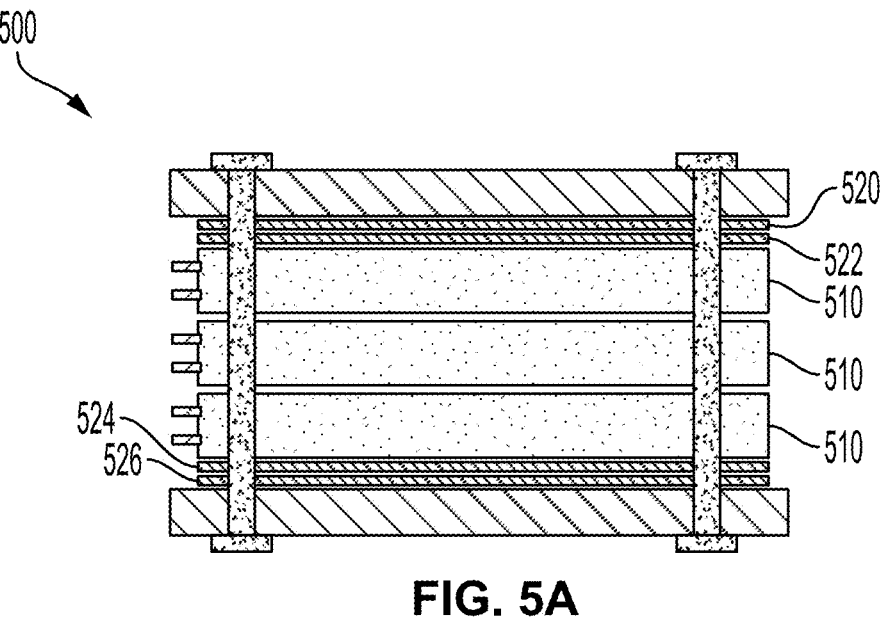
FIG. 5A is a block diagram of a pouch cell battery with a double layer pressure homogenizer medium.

FIG. 5A is a block diagram of a pouch cell battery with a double pressure homogenizer medium layer. As shown in FIG. 5A, pouch battery cell 500 includes a plurality of pouch cells 510 and two pressure homogenizer medium layers positioned between each metal plane jig and corresponding neighboring pouch cell. Hence, pressure homogenizer medium layers 520 and 522 are positioned between a first metal plane jig and corresponding neighboring pouch cell and pressure homogenizer medium layers 524 and 526 are positioned between a second metal plane jig and corresponding neighboring pouch cell.

Figure 5B:
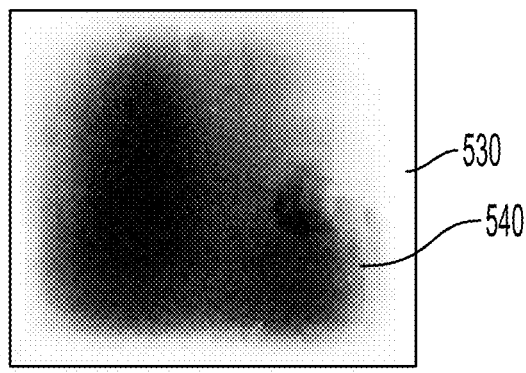
FIG. 5B is an illustration of a pouch cell pressure pattern for the double-layer pressure homogenizer medium.

FIG. 5B is an illustration of a pouch cell pressure pattern for the double-layer pressure homogenizer medium. The pouch cell pressure pattern 530 of FIG. 5B shows a more even distribution (more even compared to the pressure pattern of FIG. 4B) of pressure as shown by the discoloration 540 within the pouch cell area within the pouch cell area of pressure pattern 530.

Figure 6A:
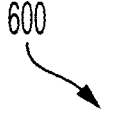
FIG. 6A is a block diagram of a pouch cell battery with a triple layer pressure homogenizer medium.
Figure 6A:
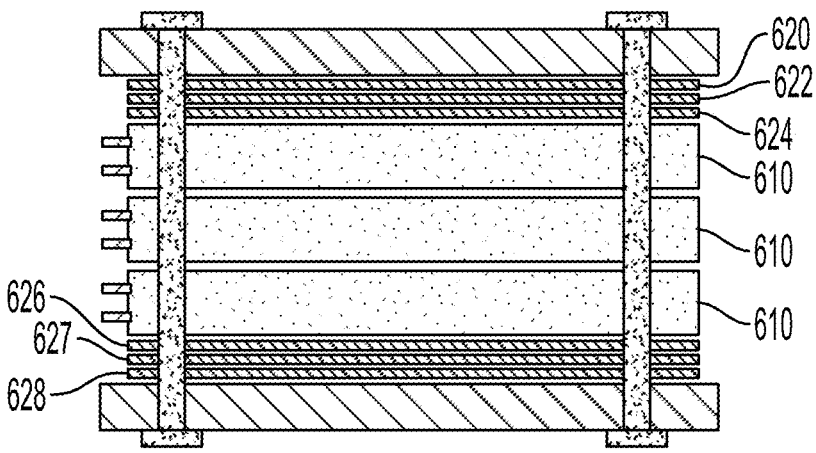

FIG. 6A is a block diagram of a pouch cell battery with a triple layer pressure homogenizer medium. As shown in FIG. 6A, pouch battery cell 600 includes a plurality of pouch cells 610 and three pressure homogenizer medium layers 620, 622, and 624 positioned between each metal plane jig and corresponding neighboring pouch cell. Hence, pressure homogenizer medium layers 620, 622, and 624 are positioned between a first metal plane jig and corresponding neighboring pouch cell and pressure homogenizer medium layers 626, 627, and 628 are positioned between a second metal plane jig and corresponding neighboring pouch cell.

Figure 6B:
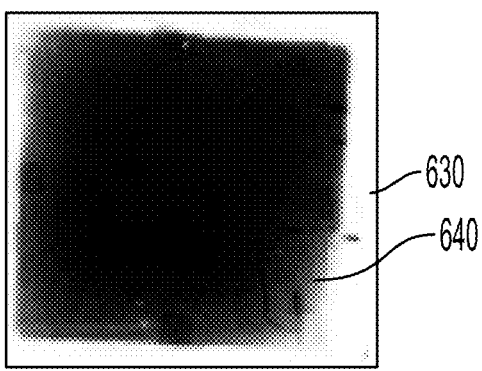
FIG. 6B is an illustration of a pouch cell pressure pattern for the triple-layer pressure homogenizer medium.

FIG. 6B is an illustration of a pouch cell pressure pattern for the triple-layer pressure homogenizer medium. The pouch cell pressure pattern 630 of FIG. 6B shows the most even distribution (in comparison with pressure patterns 430 and 530) of pressure as shown by the discoloration 640 within the pouch cell area of pressure pattern 630.

Figure 7:
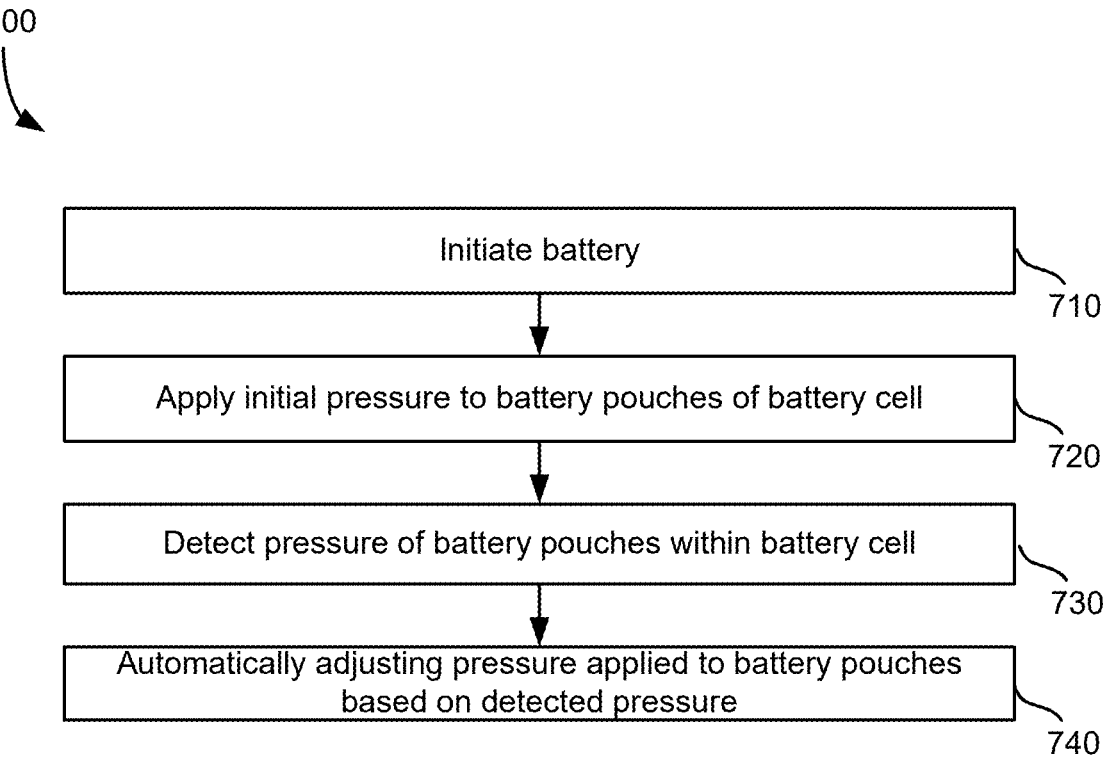
FIG. 7 is an exemplary method for pressurizing a pouch cell battery.

FIG. 7 is an exemplary method 700 for pressurizing a pouch cell battery having pressure homogenizing medium layers. The method of FIG. 7 may be implemented by the system 100 of FIG. 1A or system 105 of FIG. 1B. First, a battery may be initiated at step 710. Battery initiation may include applying a potential to a load and monitoring the battery by a battery management system. An initial pressure is applied to the battery pouches of the battery cell at step 720. The initial pressure may be selected based on a default value or other parameters detected by the battery management system which is monitoring the battery cell.

The pressure applied to the battery pouches is detected within a battery cell at step 730. The pressure can be detected by a pressure sensor displaced within the battery cell but external to the battery pouches. The pressure sensor may provide the pressure to a battery management system (BMS) or a pressure controller.

The pressure between the battery pouches within a battery cell is adjusted based on the detected pressure at step 740. In some instances, if the pressure detected between the battery pouches is outside a desired range, the pressure may be adjusted to bring the pressure within the desired range. In some instances, the desired range of pressure is 0.01 to 15 MPa. If the detected pressure is not in the desired range, the BMS or controller may control a pressure mechanism to adjust the pressure applied to the battery pouches to bring the detected pressure within the desired range. In some instances, metal plate jigs on either side of the pouch cells within the battery cell can be moved towards each other to compress the pouches if the pressure should be increased, or the metal plate jigs within the battery cell can be moved away from each other if the pressure should be decreased. In some instances, the adjustment in pressure may be between 0.01-5 MPa per iteration, depending on the equipment utilized in the battery cell and the amount the detected pressure is out of the desired pressure range.

Figure 8:
FIG. 8 is a table with exemplary parameters for pressure homogenizer medium layers within a pouch cell battery.

Pressure homogenizer medium layers incorporated into the presently described battery cell have a variety of parameters. FIG. 8 is a table with exemplary parameters for pressure homogenizer medium layers within a pouch cell battery. As shown by table 800 of FIG. 8, the number of layered pressure homogenizer mediums may range between one and 30. In some instances, a battery cell having one or more battery pouches may have between three and four pressure homogenizer medium layers adjacent to or near each metal plane jig. The thickness of each pressure homogenizer medium layer may range between 0.01 to 10 micrometers (mm). Each layer may have a Young's modulus ranging from 0.012 to 3.0 gigapascals. The density of a pressure homogenizer medium layer may range between 0.1 to 2.0 g/cc. The desirable pressure range applied to the one or more pouch cells may range between 0.01 to 15 MPa.

Figure 9:
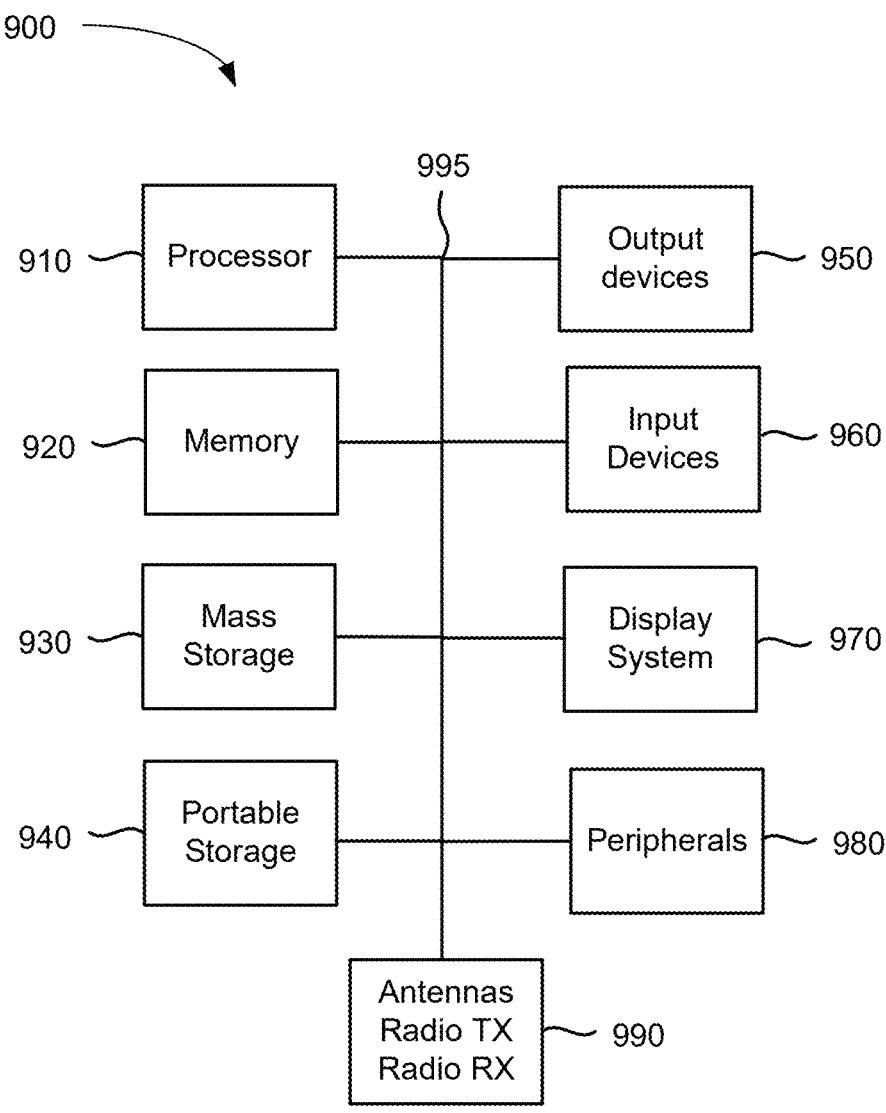
FIG. 9 is a computing environment for use with the present technology.

The components shown in FIG. 9 are depicted as being connected via a single bus 995. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touchscreen, accelerometer, and other input devices. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information and processes the information for output to the display device. Display system 970 may also receive input as a touchscreen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A battery, comprising:
    a battery casing;
    one or more battery pouches positioned adjacent to each other within the battery casing;
    a first plane jig positioned at a first end of the one or more battery pouches and a second plane jig positioned at a second end of the one or more battery pouches;
    a first pressure homogenizing medium layer and a second pressure homogenizing medium layer located adjacent to the first plane jig and the one or more battery pouches, wherein the first pressure homogenizing medium layer and the second pressure homogenizing medium layer are separate layers; and
    a third pressure homogenizing medium layer and a fourth pressure homogenizing medium layer located adjacent to the second plane jig and the one or more battery pouches, wherein the third pressure homogenizing medium layer and the fourth pressure homogenizing medium layer are separate layers.

2. The battery of claim 1, wherein the one or more battery pouches are lithium ion battery pouches.

3. The battery of claim 1, wherein a thickness of each pressure homogenizing medium layer is between 0.01 to 10 micrometers.

4. The battery of claim 1, wherein each pressure homogenizing medium layer has a Youngs modulus of 0.01-3.0 gigapascals.

5. The battery of claim 1, wherein a density of each pressure homogenizing medium layer is between 0.1 and 2.0 grams/cubic centimeter.

6. The battery of claim 1, further comprising:
    a pressure sensor located between the first plane jig and the second plane jig.

7. The battery of claim 6, wherein the pressure sensor is configured to detect a pressure applied to the one or more battery pouches and the pressure applied to the one or more battery pouches is adjusted based on the detected pressure.

8. The battery of claim 7, further comprising a controller coupled to the pressure sensor, the controller controlling displacement of the first plane jig and the second plane jig in response to a detected pressure value output by the pressure sensor.

9. The battery of claim 8, wherein the controller maintains the pressure applied to the one or more battery pouches between 0.01 to 15 megapascals.

10. A method for maintaining a homogenous pressure on battery pouches, the method comprising:
    applying an initial pressure to one or more battery pouches contained within a battery cell, the battery cell including:
        a first plane jig positioned at a first end of the one or more battery pouches and a second plane jig positioned at a second end of the one or more battery pouches,
        a pressure sensor located between the first plane jig and the second plane jig within the battery cell,
        a first pressure homogenizing medium layer and a second pressure homogenizing medium layer located adjacent to the first plane jig and the one or more battery pouches, wherein the first pressure homogenizing medium layer and the second pressure homogenizing medium layer are separate layers; and
        a third pressure homogenizing medium layer and a fourth pressure homogenizing medium layer located adjacent to the second plane jig and the one or more battery pouches, wherein the third pressure homogenizing medium layer and fourth pressure homogenizing medium layer are separate layers.

11. The method for maintaining the homogeneous pressure on battery pouches of claim 10, further comprising:
    detecting a pressure to the one or more battery pouches by the pressure sensor.

12. The method of claim 10, wherein the one or more battery pouches are lithium ion battery pouches.

13. The method of claim 10, wherein a thickness of each pressure homogenizing medium layer is between 0.01 to 10 micrometers.

14. The method of claim 10, wherein each pressure homogenizing medium layer has a Youngs modulus of 0.01-3.0 gigapascals.

15. The method of claim 10, wherein a density of each pressure homogenizing medium layer is between 0.1 and 2.0 grams/cubic centimeter.

16. The method for maintaining the homogeneous pressure on battery pouches of claim 11, further comprising:
    adjusting the pressure applied to the battery pouches by a pressure mechanism based on the detected pressure.

17. The method of claim 16, wherein adjusting includes using a controller, coupled to the pressure sensor, to control displacement of the first plane jig and the second plane jig in response to a detected pressure value output by the pressure sensor.

18. The method of claim 17, wherein the controller maintains the pressure applied to the one or more battery pouches between 0.1 to 10 megapascals.

\* \* \* \* \*